(12) United States Patent
Macholz

(10) Patent No.: US 7,416,439 B2
(45) Date of Patent: Aug. 26, 2008

(54) METHODS AND DEVICES FOR PREPARING WIRES FOR INSTALLATION IN A HEADREST ENTERTAINMENT SYSTEM

(75) Inventor: Jeff Macholz, Patchogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 0 days.

(21) Appl. No.: 11/593,306

(22) Filed: Nov. 6, 2006

(65) Prior Publication Data

US 2007/0105444 A1 May 10, 2007

Related U.S. Application Data

(60) Provisional application No. 60/734,352, filed on Nov. 7, 2005.

(51) Int. Cl.
*H01R 13/72* (2006.01)
(52) U.S. Cl. ...................................................... 439/501
(58) Field of Classification Search .................. 439/501, 439/367, 374, 378, 502; 297/217.3; 156/50; 174/71 R; 254/134.3 FT
See application file for complete search history.

(56) References Cited

U.S. PATENT DOCUMENTS

| | | | | |
|---|---|---|---|---|
| 2,939,905 | A * | 6/1960 | Canfield | 174/71 R |
| 4,472,216 | A * | 9/1984 | Hogenholt et al. | 156/50 |
| 5,140,975 | A * | 8/1992 | Krauter | 600/139 |
| 5,929,719 | A * | 7/1999 | Turner | 333/81 R |
| 6,090,104 | A * | 7/2000 | Webster, Jr. | 606/41 |
| 6,360,130 | B1 * | 3/2002 | Duysens et al. | 607/132 |
| 6,911,596 | B2 * | 6/2005 | Ohtsubo et al. | 174/36 |
| 7,216,846 | B2 * | 5/2007 | Crawford | 254/134.3 FT |
| 7,257,889 | B1 * | 8/2007 | Guitas | 29/825 |
| 2005/0099042 | A1 | 5/2005 | Vitito | 297/217.3 |

\* cited by examiner

*Primary Examiner*—Chandrika Prasad
(74) *Attorney, Agent, or Firm*—F. Chau & Associates, LLC

(57) ABSTRACT

A device for preparing a wire for installation in a headrest entertainment system for a vehicle includes a wire wrapper for facilitating feeding of the wire including a plurality of connectors through a headrest post. The wire wrapper includes a heat shrink tubing covering the connectors. The wire wrapper includes a braided sleeving covering the connectors. A stiff wire is attached to the wire near an end of the heat shrink tubing. A stiff wire is attached to the wire near an end of the braided sleeving.

17 Claims, 10 Drawing Sheets

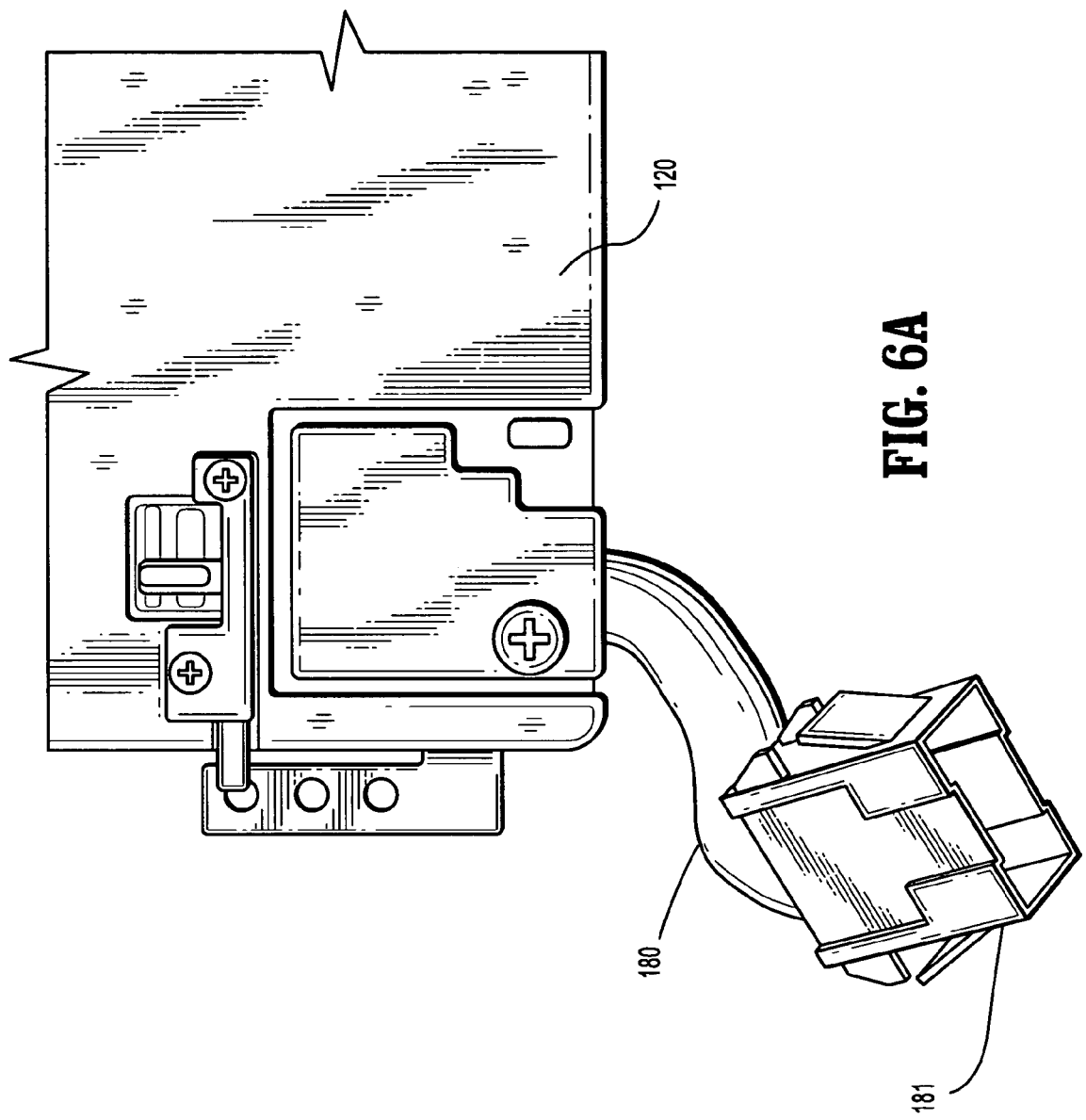

METHODS AND DEVICES FOR PREPARING WIRES FOR INSTALLATION IN A HEADREST ENTERTAINMENT SYSTEM

CROSS-REFERENCE TO RELATED APPLICATION

This application claims the benefit of U.S. Provisional Application Ser. No. 60/734,352, filed Nov. 7, 2005, the contents of which are herein incorporated by reference in their entirety.

BACKGROUND OF THE INVENTION

1. Technical Field

The present disclosure relates to methods and devices for preparing wires, and more particularly to methods and devices for preparing wires for installation in a headrest entertainment system for a vehicle.

2. Discussion of Related Art

An entertainment system for a vehicle, such as a headrest entertainment system, is popular because passengers can enjoy audio and video entertainment on the road. The headrest entertainment system includes, for example, a media unit with a display, and a media player. The media player can be formed in the media unit or other parts of the vehicle.

The media unit can be electrically connected to a media player in another headrest, for example, a DVD player, via connectors attached to, for example, a wire harness and/or a distribution box. The connectors are formed at the end of a wire(s), which run from the media unit. The wire(s), including connectors are fed through headrest supports and the connectors are connected to the wire harness or distribution box. However, since the connectors formed at the end of the wire(s) are loosely organized, it is difficult to feed the wire(s) through the headrest supports when installing the media unit.

Thus, a need exists for a wire organizing method which facilitates feeding of wires through the headrest supports, seats of a vehicle and/or other parts of the vehicle.

SUMMARY OF THE INVENTION

According to an embodiment of the present invention, a device for preparing a wire for installation in a headrest entertainment system for a vehicle comprises a wire wrapper for facilitating feeding of the wire including a plurality of connectors through a headrest post.

The wire wrapper may comprise a heat shrink tubing covering the connectors. The wire wrapper may comprise a braided sleeving covering the connectors.

A stiff wire can be attached to the wire near an end of the heat shrink tubing. A stiff wire can be attached to the wire near an end of the braided sleeving.

Tape can be wrapped around the wire near ends of the braided sleeving to protect the connectors. Heat shrink tubing can be wrapped around the wire near ends of the braided sleeving to protect the connectors.

The stiff wire can be attached to the wire using at least one of tape or heat shrink tubing.

The heat shrink tubing may comprise partially polymerized plastic. The braided sleeving may comprise at least one of polyethylene terepthalate, fiberglass, or polyester. The stiff wire may comprise metal.

The connectors may comprise electrical connectors for providing at least one of power, ground, and audio/video connections for the entertainment system.

According to an embodiment of the present invention, a method for preparing a wire for installation in a headrest entertainment system comprises wrapping a plurality of connectors attached to the wire with a wire wrapper for covering the connectors, feeding the wire through a headrest post, and removing the wire wrapper.

BRIEF DESCRIPTION OF DRAWINGS

Exemplary embodiments of the present invention can be understood in more detail from the following descriptions taken in conjunction with the accompanying drawings, of which:

FIGS. 6A-6B show an electrical connector running from a media unit, according to an embodiment of the present invention;

DETAILED DESCRIPTION OF EXEMPLARY EMBODIMENTS

Exemplary embodiments of the present invention will now be described more fully hereinafter below in more detail with reference to the accompanying drawings. This invention may, however, be embodied in different forms and should not be construed as limited to the embodiments set forth herein.

Figure 1:
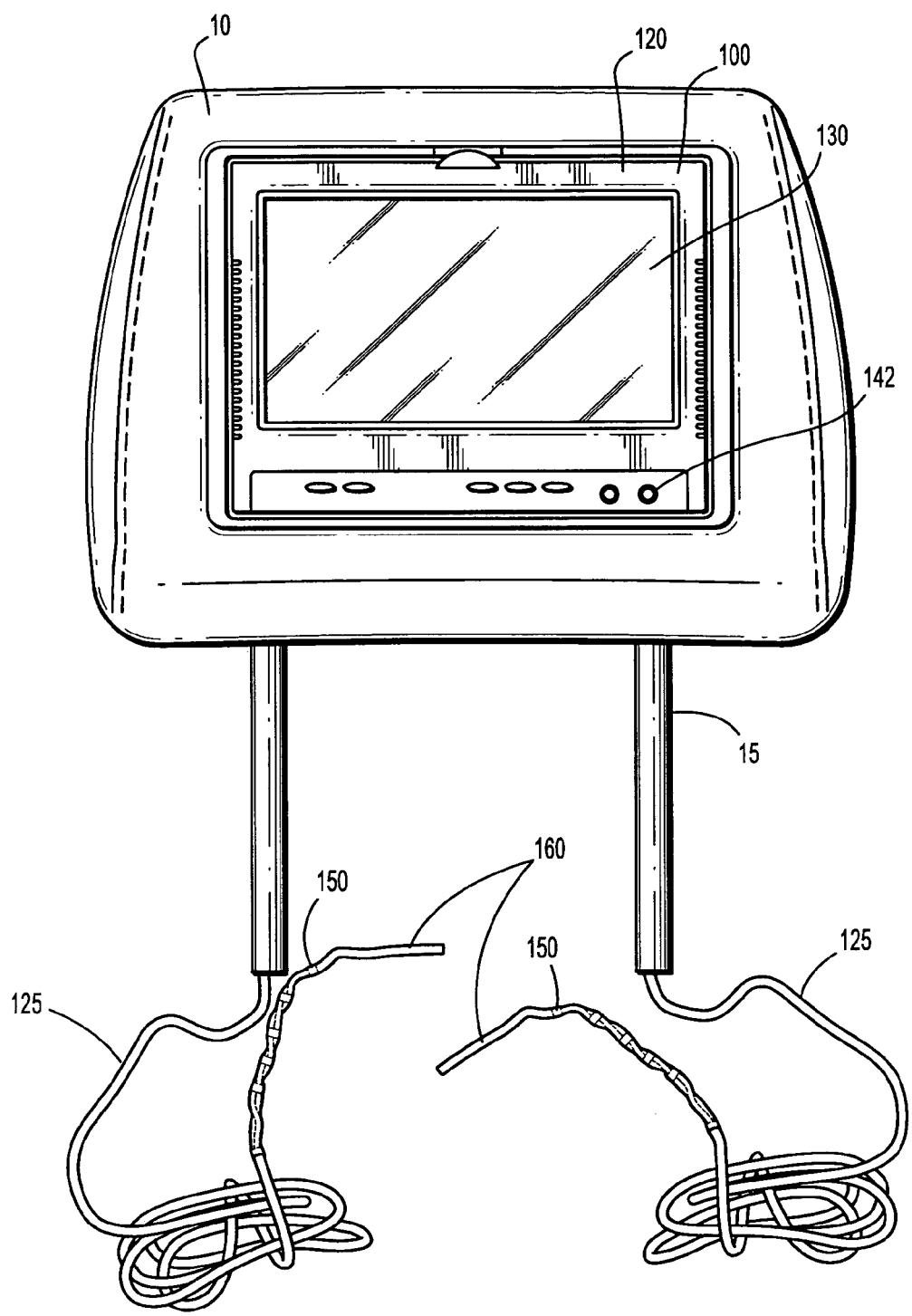
FIG. 1 shows a headrest entertainment system with shrink-wrapped wire connectors, according to an embodiment of the present invention.
Figure 3:
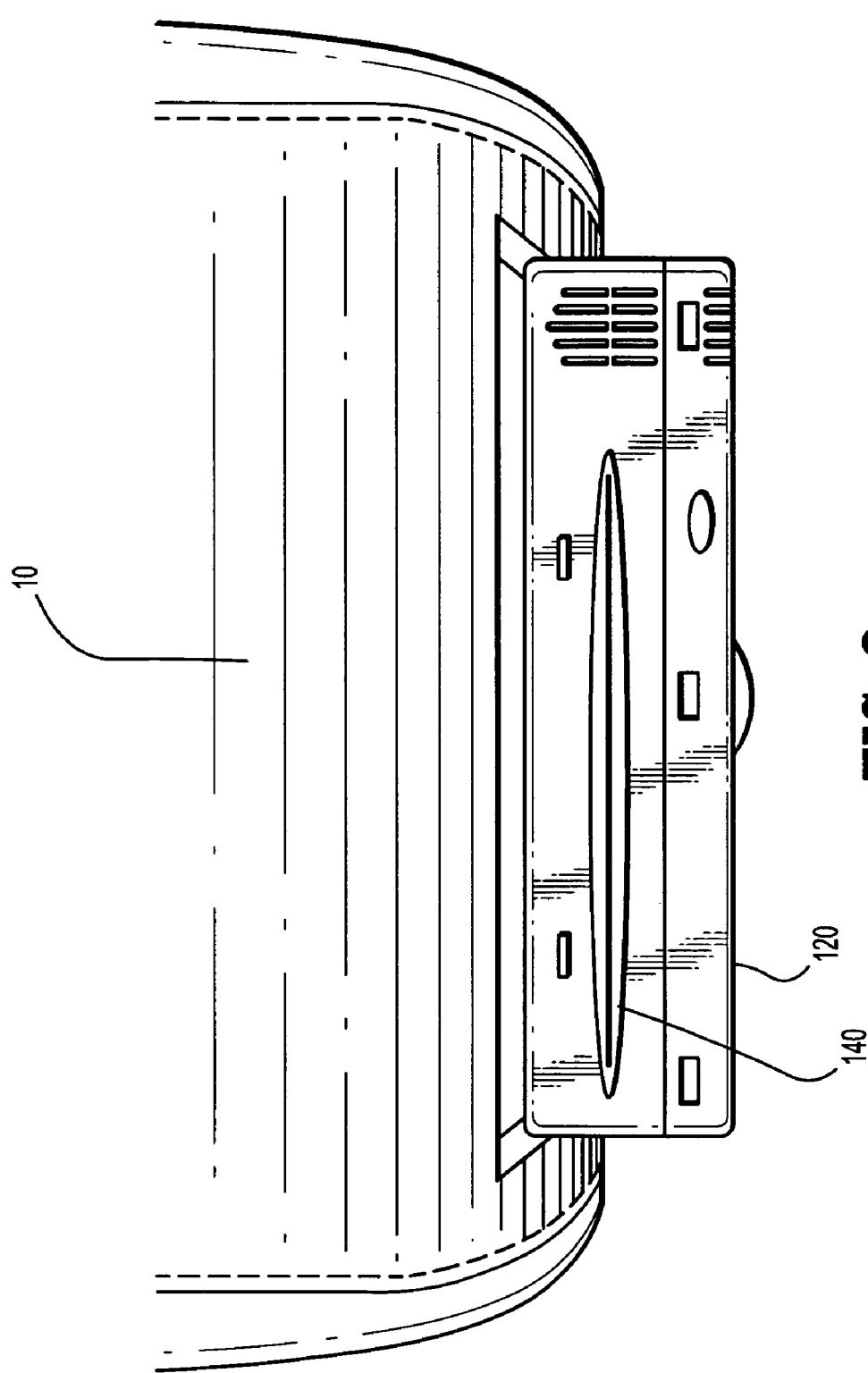
FIG. 3 shows a top view of a headrest entertainment system with a media unit pivoted outward with respect to a headrest, according to an embodiment of the present invention.

Referring to FIG. 1, a headrest 10 includes an entertainment system 100 mounted therein. The entertainment system 100 includes a media unit 120 with a display 130 having a screen for displaying a video program. The screen is preferably an LCD type display, but may be another type of display, such as, for example, an organic LED or electro-luminescent display. The video program is supplied from a media player, for example, a DVD player 140 provided behind the display 130 (see FIG. 3). The media source may also be, for example, a CD-ROM player, a video game player, a videocassette player, a television tuner, a radio tuner, a wireless receiver, an MP3 player, a digital video recorder, and/or a device for playing media supplied from a portable storage device (e.g., a portable hard drive, memory cards, flash memory sticks, key drives, thumb drives). Alternatively, the display 130 can be electrically connected to an auxiliary media source through auxiliary port 142.

In another alternative, the display is electrically connected to a media player, for example, another DVD player in another headrest, via one of the connectors 150 attached to, for example, a wire harness, a power supply, and/or a distribution box (not shown). The connectors 150 are formed at the end of a wire(s) 125, which run from the entertainment system 100. For example, the wire 125 may include a plurality of wires, and each connector 150 can be attached to each of the plurality of wires. The wire(s) 125, including connectors 150 are fed through the headrest supports 15 and the connectors 150 are connected to, for example, the wire harness. The connectors 150 preferably include electrical connectors, for example, pin connectors, for connecting to the wire harness. The connectors 150 provide, for example, power, ground, and audio/video inputs and outputs to and from the entertainment system 100. For example, video from DVD player 140 may be supplied to a display located in another headrest of the vehicle. The connectors 150 also include control lines for a wireless modulator for supplying wireless audio to a vehicle sound system or for communication of the video, audio or control signals between the media player and display 130.

Figure 2:
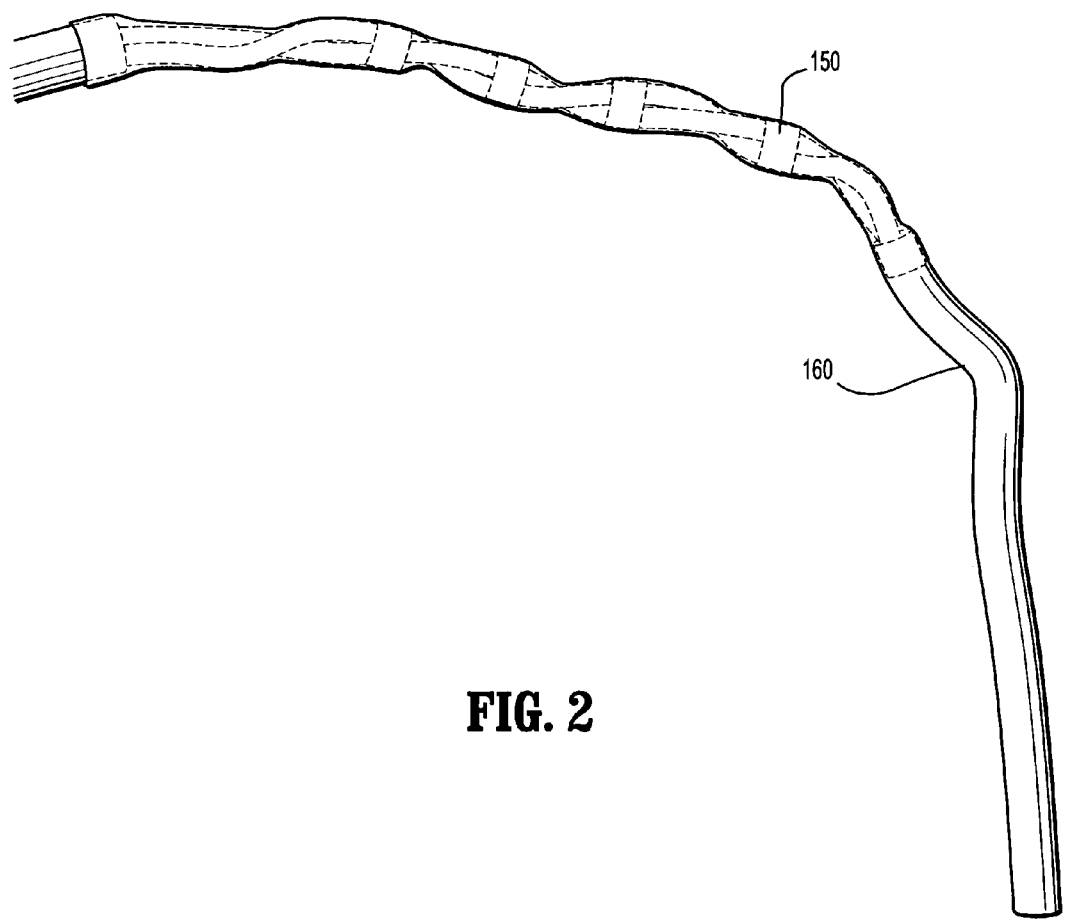
FIG. 2 shows a close-up view of the shrink-wrapped connectors of FIG. 1.

Referring to FIGS. 1 and 2, in order to facilitate feeding of the wires 125 including the connectors 150 from an upper portion of the headrest 10 through the headrest posts 15, the connectors 150 are shrink wrapped in, for example, heat shrink tubing 160. The heat shrink tubing 160 is such that it provides a compact and low profile covering for the connectors 150 by conforming to the size and shape of the connectors 150. The heat shrink tubing 160 preferably includes partially polymerized plastic. The heat shrink tubing 160 may be formed from material, such as, for example, polyolefin and fluoropolymer resins, such as, fluorinated ethylene propylene (FEP) and perfluoroalkoxy (PFA).

Once passed through the headrest posts 15, and fed to the wire harness, a user/installer of the headrest entertainment system can remove the tubing 160 by, for example, cutting off the tubing 160, thereby exposing the connectors 150 so that the connectors 150 can be mated with, for example, the harness.

In an embodiment of the present invention, the wires 125 including the connectors 150 can be fed up the headrest posts 15 into the headrest 10. In order to facilitate feeding of the wires 125 including the connectors 150 from the headrest posts 15 through the headrest 10, the connectors 150 are shrink wrapped in, for example, heat shrink tubing 160 or braided sleeving 170. Once passed through the headrest posts 15, and fed to the wire harness, a user/installer of the headrest entertainment system can remove the tubing 160 by, for example, cutting off the tubing 160, thereby exposing the connectors 150 so that the connectors 150 can be mated with, for example, the harness.

In an embodiment, the connectors 150 mated with the harness can be folded or bent, for example, in half for reducing the amount of space occupied by the connector/harness combination and placed inside a connector cover (not shown). The connector cover, enclosing the connectors 150 mated with the harness, can be placed inside the headrest 10.

Figure 4:
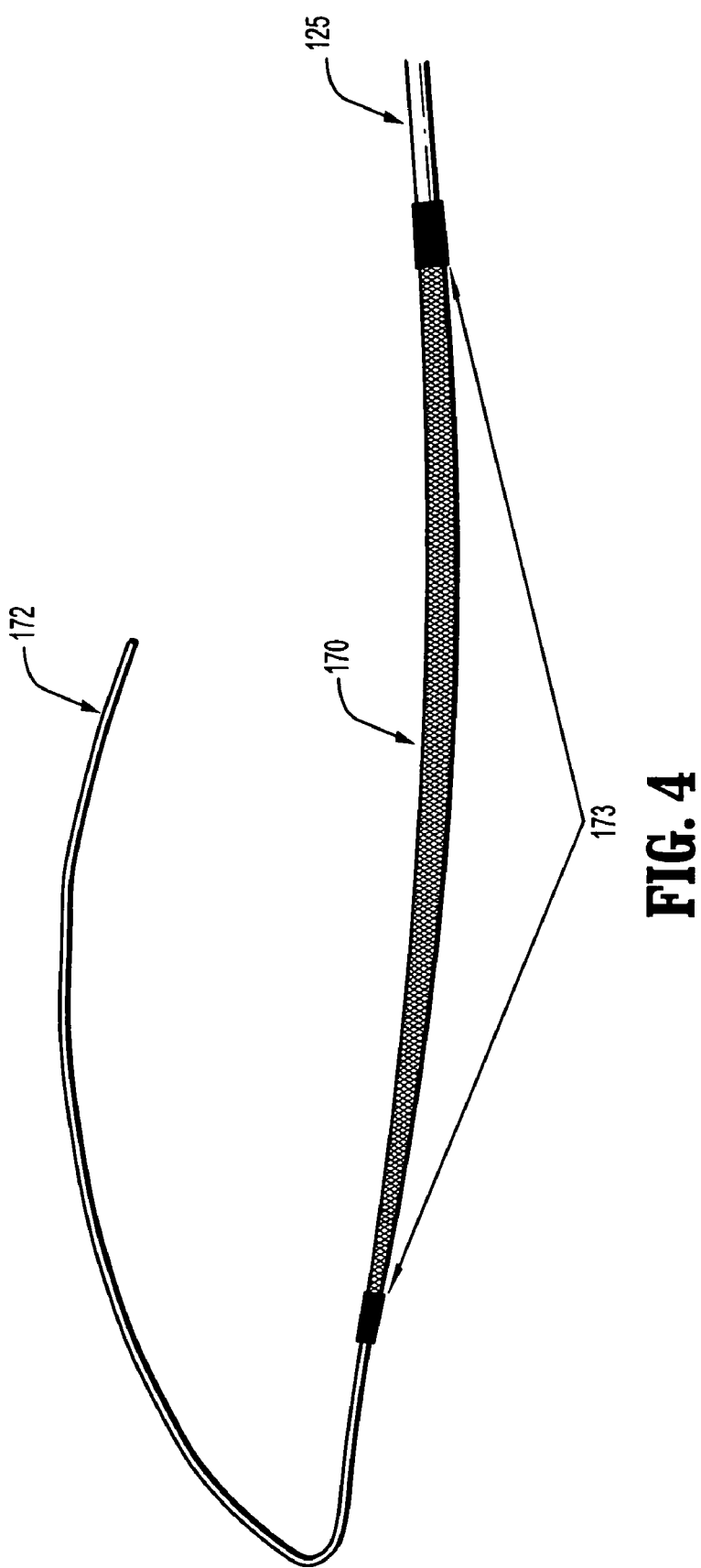
FIG. 4 shows a view of wire connectors wrapped in braided sleeving, according to an embodiment of the present invention.

Referring to FIG. 4, as an alternative to the heat shrink tubing 160, braided sleeving 170 can be used to wrap the connectors 150. The braided sleeving 170 may be formed from, for example, polyethylene terephthalate (PET), fiberglass, and/or polyester. In an embodiment, a stiff wire 172 is attached to wire 125 at a location near the end of the braided sleeving 170. The stiff wire further facilitates feeding of the wire 125 through the headrest posts 15 and through a seat to which the headrest 10 is mounted. The stiff wire 172 provides a rigid member which can be gripped, by, for example, a wire puller, to enable smooth feeding of the wire 125 through the headrest post 15 to the bottom of a seat. The stiff wire 172 may comprise metal, such as, for example, aluminum, spring steel or plastic. In another alternative, the stiff wire 172 may also be attached at the end of the heat shrink tubing 160.

As shown in FIG. 4, tape 173, for example, electrical tape, is wrapped around the wire 125 at the ends of the braided sleeving 170 to protect the connectors 150 and to hold the stiff wire 172 in place. As an alternative to the tape 173, heat shrink tubing may be used.

At the bottom of a seat, when the connectors 150 are to be mounted to a wire harness, the tape 173 (or heat shrink tubing) is removed by a user/installer by, for example, cutting the tape 173 (or heat shrink tubing). Then, the braided sleeving 170 is removed by carefully pulling on the wire 125 and holding the braided sleeving 170. The braided sleeving 170 may be expanded by pushing around the end of the braided sleeving 170 where the tape 173 (or heat shrink tubing) was removed.

Figure 5A:
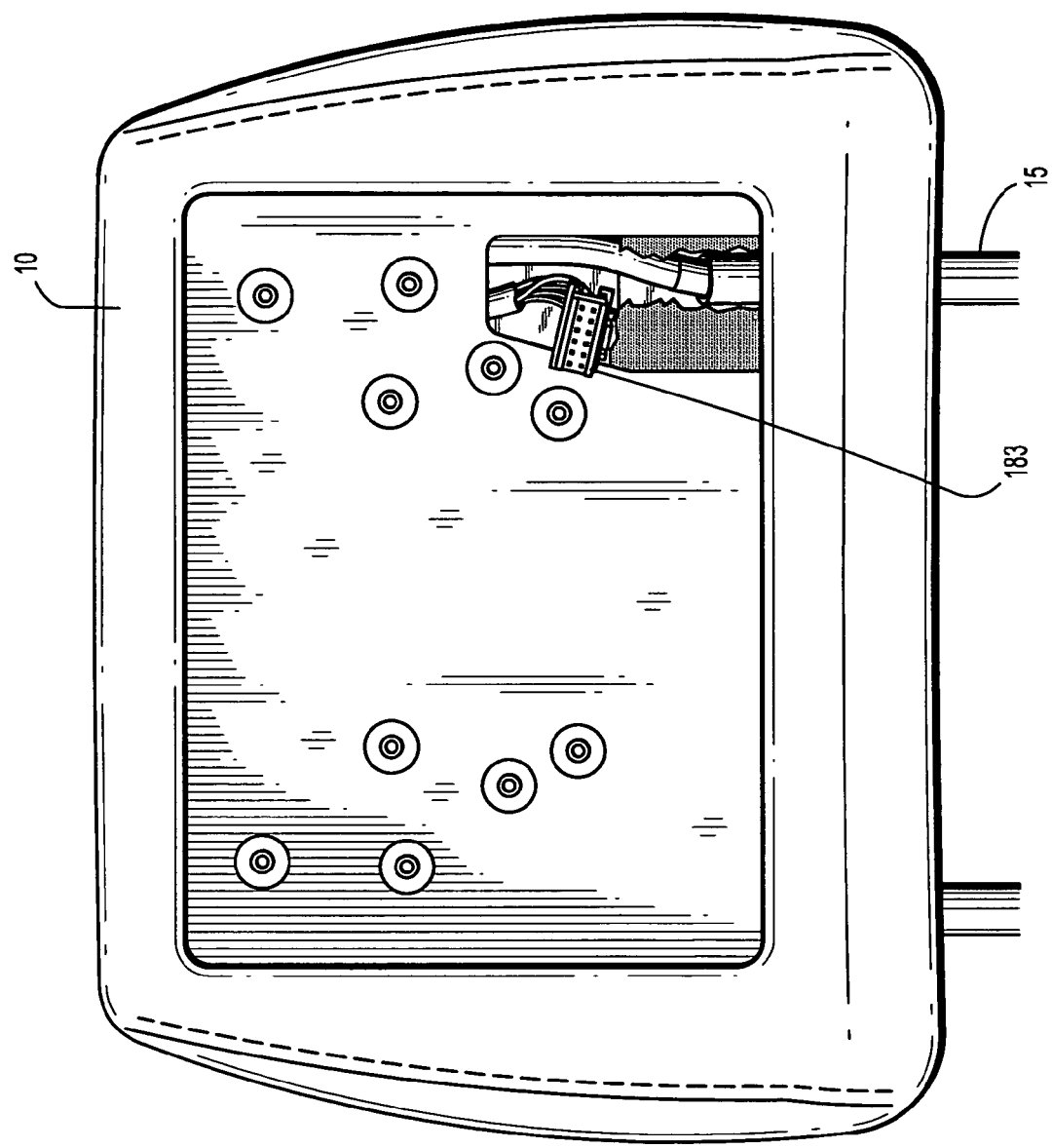
FIG. 5A shows a front view of a headrest including a wired connection, according to an embodiment of the present invention.
Figure 5B:
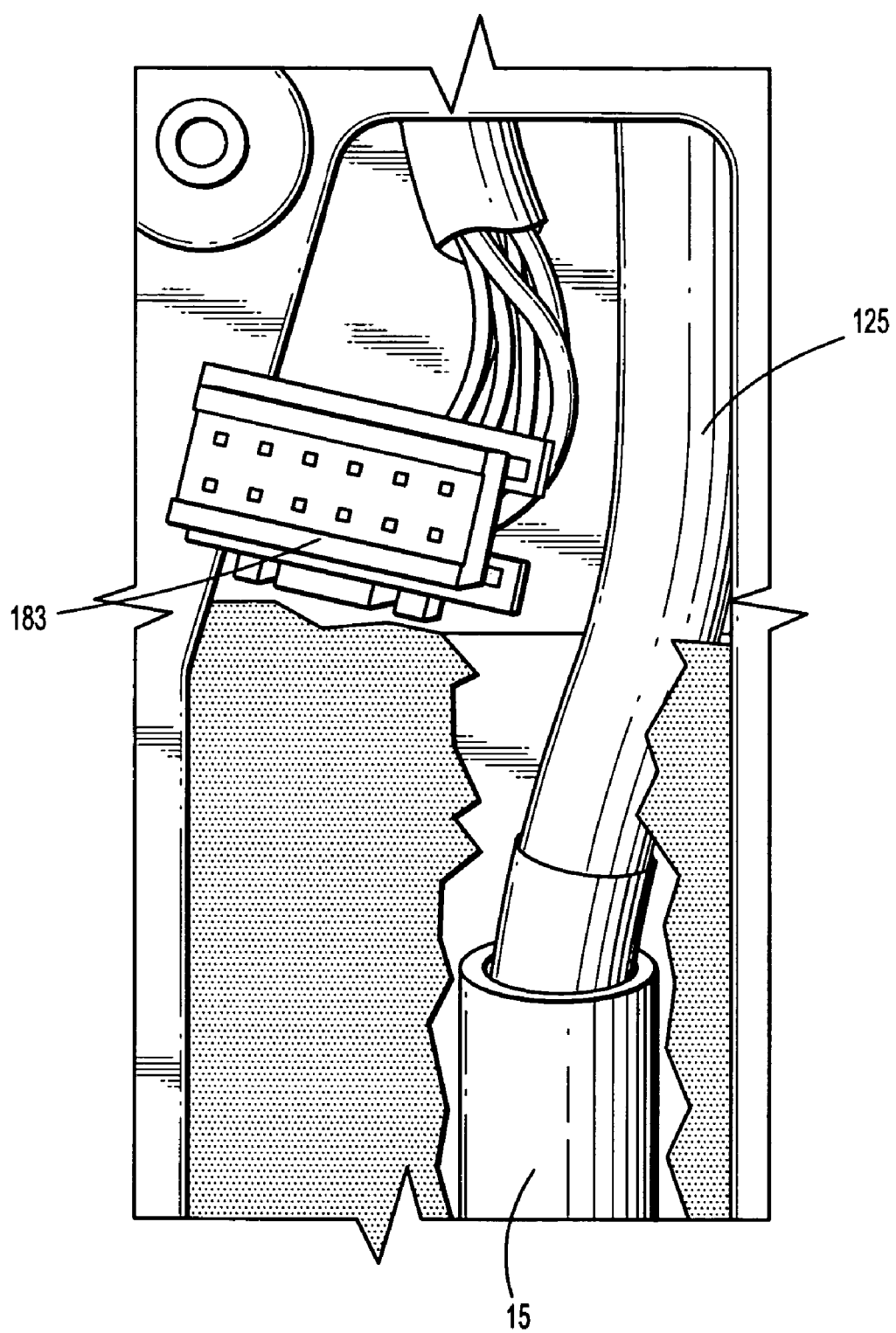
FIG. 5B shows a close-up view of the wired connection shown in FIG. 5A, according to an embodiment of the present invention.
Figure 6B:
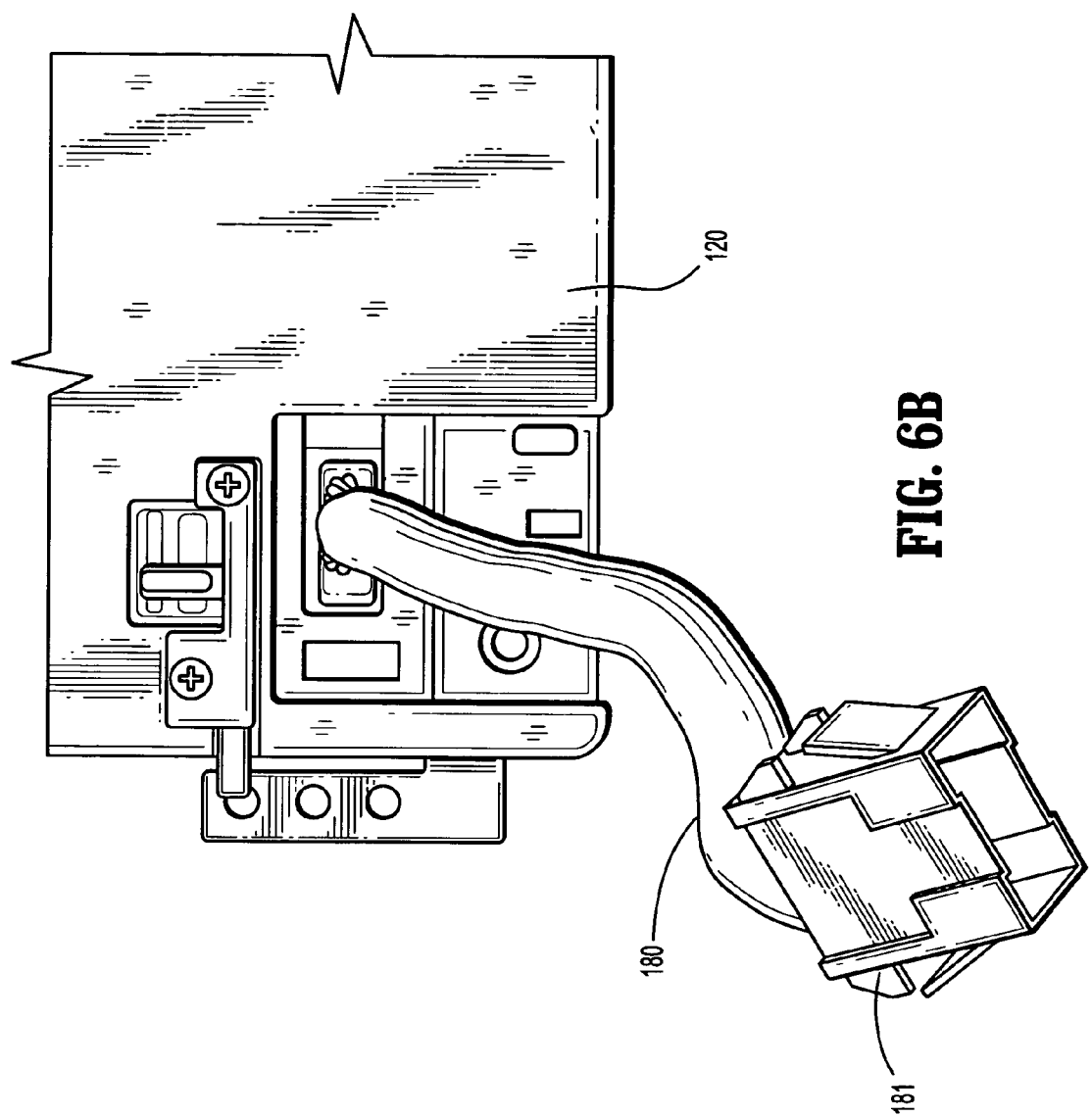
Figure 6C:
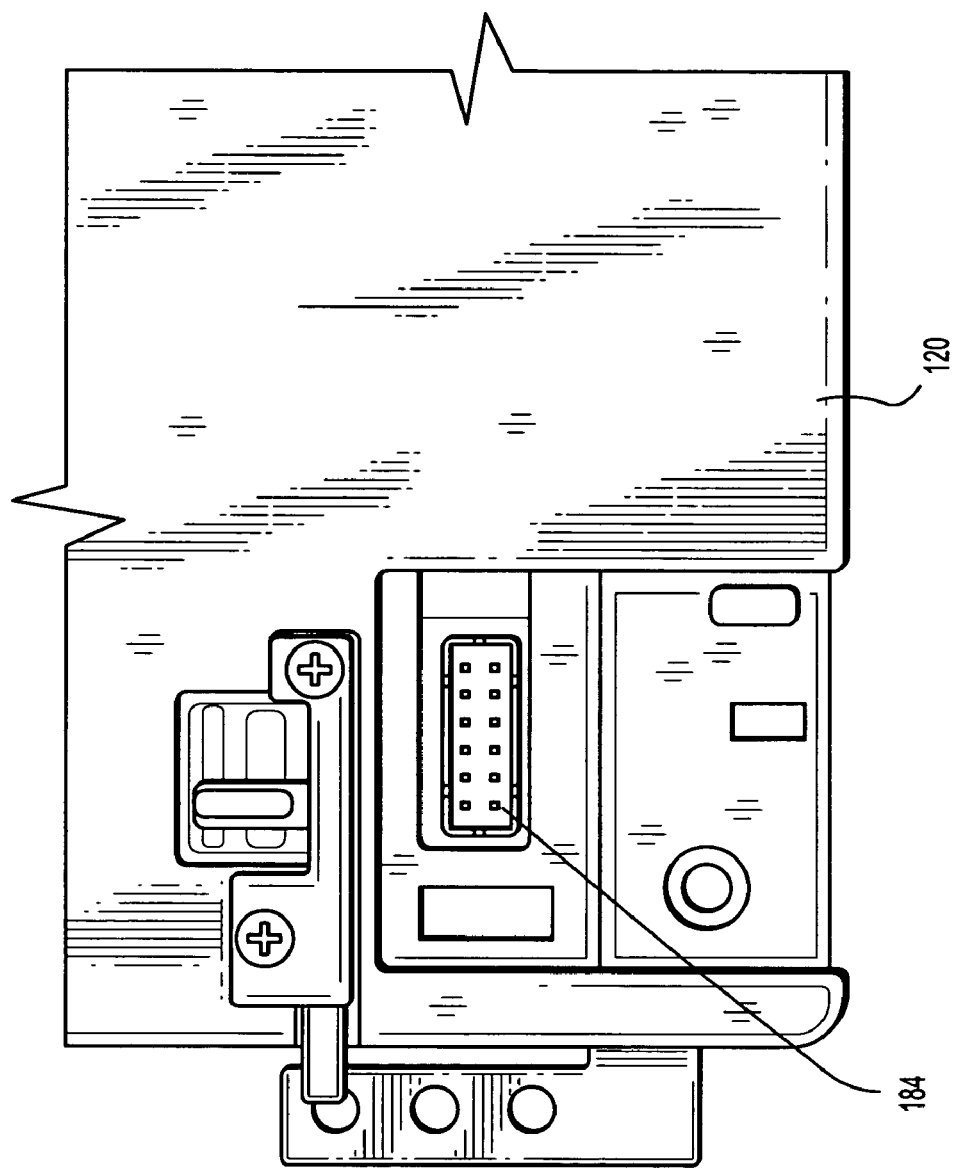
FIG. 6C shows a connector positioned in the media unit for receiving the electrical connector shown in FIG. 6D, according to an embodiment of the present invention.
Figure 6D:
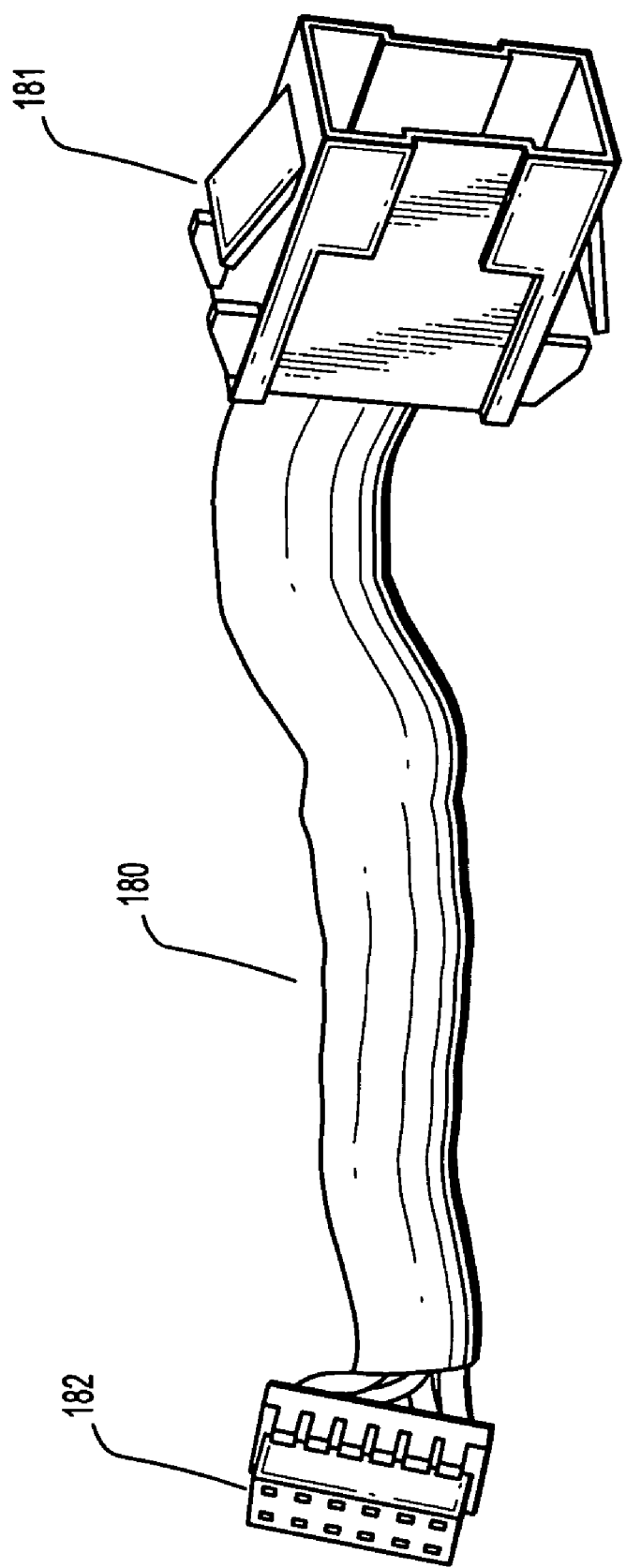
FIG. 6D shows an electrical connector, according to an embodiment of the present invention.

Referring to FIGS. 6A-6D, the wired connection running from the media unit 120 preferably includes a two-headed electrical connector 180, including, for example, pin connectors 181 and 182. The pin connector 181 connects to a mating pin connector 183 positioned in the headrest 10 (see FIGS. 5A-5B), which is, in turn, connected to wire 125 running through the headrest support rods 15 to connect to a wire harness (not shown). By unplugging the pin connectors 181, 183 from each other, a user is able to remove the media unit 120 from the headrest 10 without cutting or pulling apart the wires. The pin connector 182 connects to a mating pin connector 184 positioned in the media unit 120. The electrical connector 180 is positioned at a rear portion of the media unit 120, with pin connector 182 connected to pin connector 184.

Although exemplary embodiments have been described herein with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A device for preparing a wire for installation in a headrest entertainment system for a vehicle, the device comprising:
   a wire including a first end having a first connector and a second end having a plurality of connectors;
   a two-headed electronic connector including a first end having a first connector and a second end having a second connector;
   a wire wrapper wrapping around the second end of the wire for facilitating feeding of the wire through a headrest post,
   wherein the first connector of the two-headed electronic connector is connected to the first connector of the wire running through the headrest post and the second connector of the two-headed electronic connector is connected to a media unit.

2. The device of claim 1, wherein the wire wrapper comprises a heat shrink tubing covering the connectors.

3. The device of claim 1, wherein the wire wrapper comprises a braided sleeving covering the connectors.

4. The device of claim 2, further comprising a stiff wire attached to the wire near an end of the heat shrink tubing.

5. The device of claim 3, further comprising a stiff wire attached to the wire near an end of the braided sleeving.

6. The device of claim 5, wherein tape is wrapped around the wire near ends of the braided sleeving to protect the connectors.

7. The device of claim 5, wherein heat shrink tubing is wrapped around the wire near ends of the braided sleeving to protect the connectors.

8. The device of claim 5, wherein the stiff wire is attached to the wire using at least one of tape or heat shrink tubing.

9. The device of claim 2, wherein the heat shrink tubing comprises partially polymerized plastic.

10. The device of claim 3, wherein the braided sleeving comprises at least one of polyethylene terepthalate, fiberglass, or polyester.

11. The device of claim 5, wherein the stiff wire comprises metal.

12. The device of claim 1, wherein the connectors comprise electrical connectors for providing at least one of power, ground, and audio/video connections for the entertainment system.

13. A method for preparing a wire for installation in a headrest entertainment system, the method comprising:
    wrapping a plurality of connectors attached to a first end of the wire with a wire wrapper for covering the connectors;
    feeding the first end of the wire through a headrest post;
    removing the wire wrapper; and
    connecting a second end of the wire fed through the headrest post to a first end of a two-headed electronic connector;
    connecting a second end of the two-headed electronic connector connected to a media unit,
    wherein the wire wrapper comprises a heat shrink tubing or a braided sleeving.

14. The method of claim 13, further comprising attaching a stiff wire to the wire at a location near an end of the wire wrapper.

15. The method of claim 13, further comprising wrapping the wire with tape at ends of the braided sleeving to protect the connectors.

16. The method of claim 14, wherein the stiff wire is attached to the wire using tape.

17. The device of claim 1, wherein the wire wrapper is removed after feeding of the wire through the headrest post.

* * * * *